United States Patent [19]

Skutecki

[11] 4,312,039

[45] Jan. 19, 1982

[54] TRANSIENT FREE SYNCHRONIZATION SYSTEM

[75] Inventor: Edmund R. Skutecki, Glendale, Ariz.

[73] Assignee: Sperry Corporation, New York, N.Y.

[21] Appl. No.: 114,784

[22] Filed: Jan. 24, 1980

[51] Int. Cl.³ .............. G06G 7/70; G05D 1/10; B64C 11/34
[52] U.S. Cl. .................. 364/434; 244/17.13; 244/179
[58] Field of Search ............ 364/434, 424, 443; 244/17.13, 17.19, 175, 179, 184, 194, 195, 196, 197; 318/585, 586, 584

[56] References Cited

U.S. PATENT DOCUMENTS

| | | | |
|---|---|---|---|
| 3,520,499 | 7/1970 | Ask | 244/17.13 |
| 3,848,833 | 11/1974 | Rauschelbach | 364/434 X |
| 4,032,083 | 6/1977 | Maciolek | 364/434 X |
| 4,067,517 | 1/1978 | Barnum | 244/17.13 |
| 4,103,848 | 8/1978 | Johnson, Jr. et al. | 244/17.13 |
| 4,109,886 | 8/1978 | Tribken et al. | 364/434 X |

Primary Examiner—Joseph F. Ruggiero
Attorney, Agent, or Firm—Howard P. Terry

[57] ABSTRACT

An aircraft automatic yaw stabilization system with heading hold and manual command override capability provides circuit means responsive to the manual commands for suppressing heading transients in commmanding a heading change and in the ultimate capture of a desired heading.

6 Claims, 4 Drawing Figures

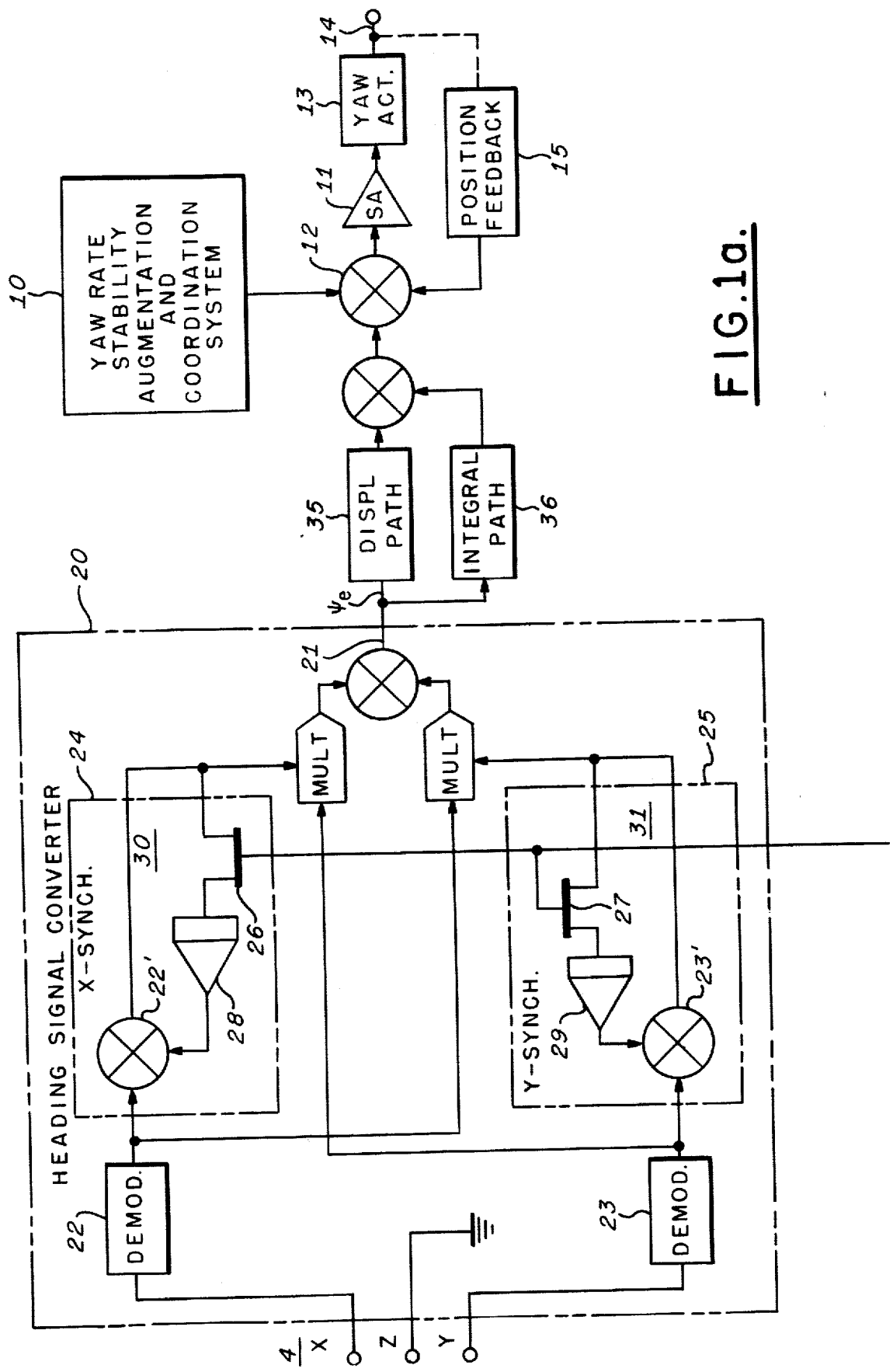

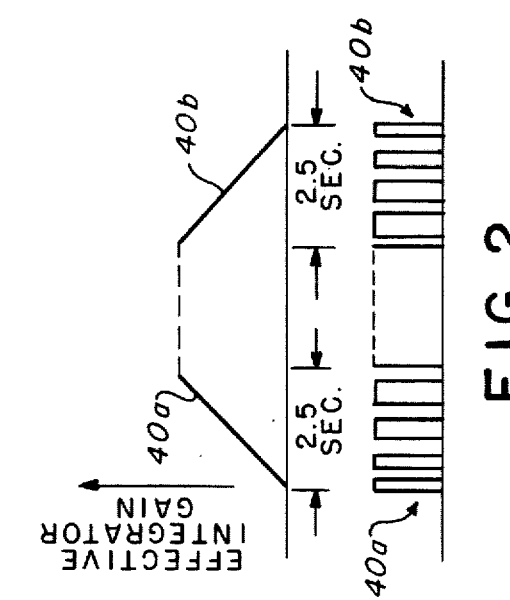
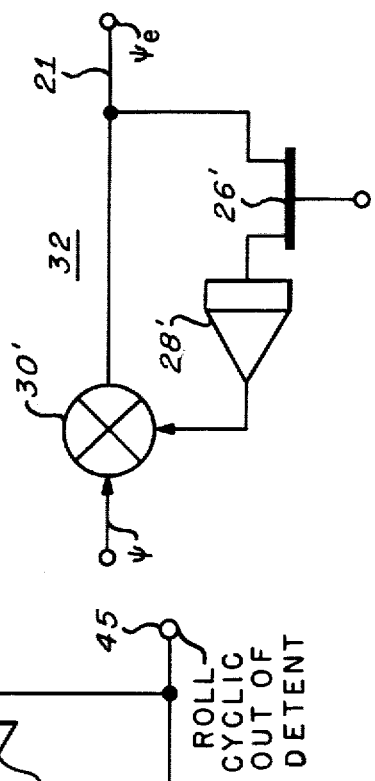
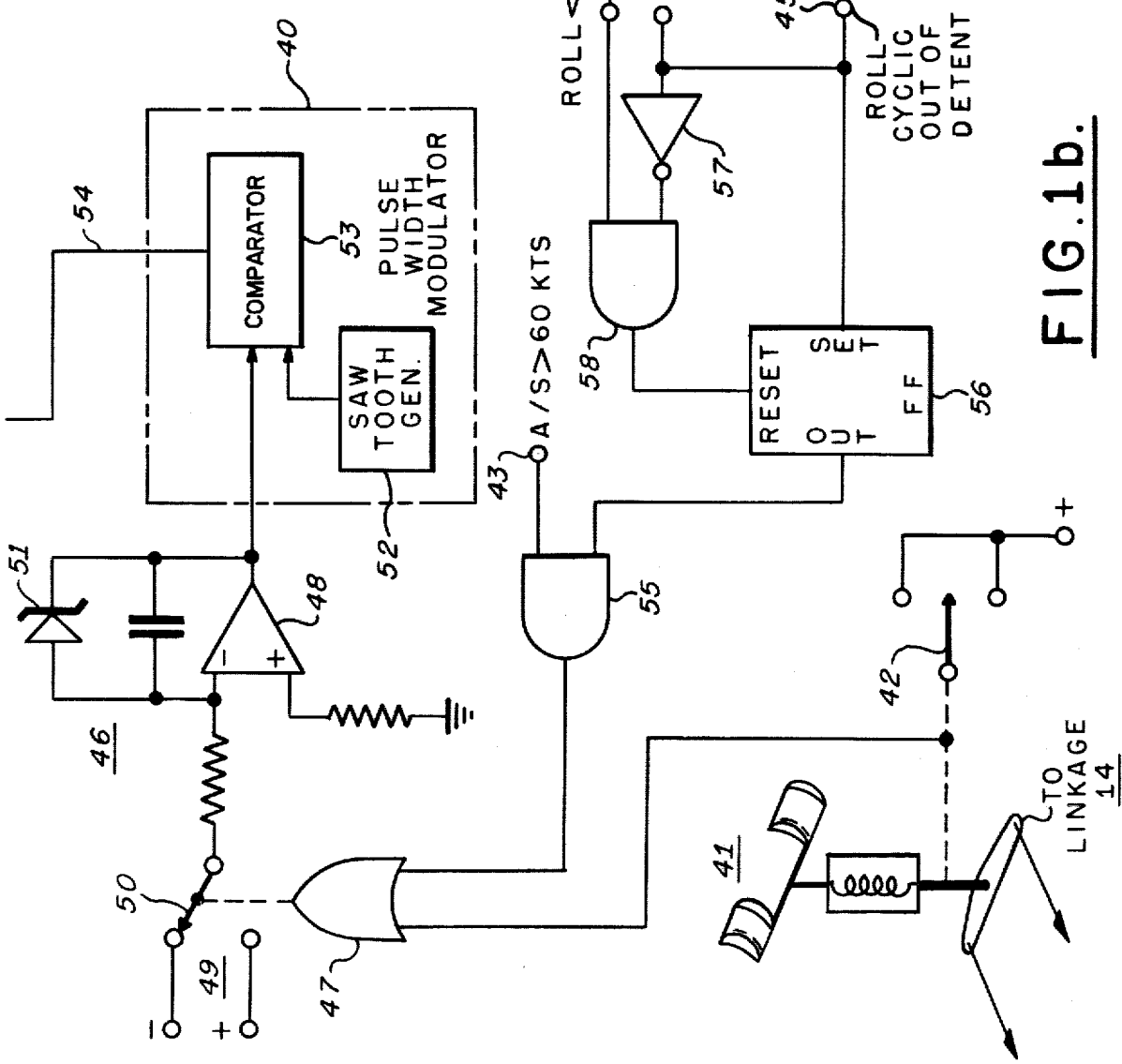

TRANSIENT FREE SYNCHRONIZATION SYSTEM

BACKGROUND OF THE INVENTION

1. Field of the Invention

The invention relates to aircraft control systems and more particularly to automatic aircraft control systems which include synchronization loops used in transitions between attitude follow-up modes and attitude hold modes of operation.

2. Description of the Prior Art

Aircraft automatic stabilization control systems, for example, those adapted for use in the attitude axes of a helicopter, conventionally have an attitude hold capability which may be overridden by autopilot or manual control. In transitions between such hold and override modes, overshoot and discontinuities in the control may be and usually are experienced. The known prior art systems, as will be further discussed, do not fully compensate for transients in control sensitivity on initiation of a manually commanded attitude change, such as a turn maneuver, nor do they effectively eliminate overshoots at the termination of such commanded maneuvers.

SUMMARY OF THE INVENTION

The present invention overcomes the problems of the prior art by providing a variable time-constant synchronization loop to aid in achieving a smooth transition from the follow-up or synchronization mode to the hold mode and vice versa.

BRIEF DESCRIPTION OF THE DRAWINGS

FIG. 1, comprised of FIGS. 1a and 1b, is a schematic block diagram showing the basic electrical and mechanical elements of the invention and their various interconnections as applied to the yaw axis of an aircraft such as a helicopter.

FIG. 2 presents graphs useful in explaining the operation of the invention.

FIG. 3 is a simplified schematic of the integrator and synchronization loop embodied in the present invention.

DESCRIPTION OF THE PREFERRED EMBODIMENT

FIG. 1 illustrates, in the FIG. 1a portion of the drawing, a conventional yaw axis stability augmentation or yaw damper system as applied to stabilize the yaw axis of a helicopter and further includes a heading hold or heading command capability. However, it will be understood that the invention may be similarly incorporated to stabilize and control the pitch and roll axes of the helicopter. In its broader aspects, the invention is applicable to fixed wing aircraft.

The basic control elements of the system comprise a conventional yaw stability augmentation or yaw damper 10 which includes conventional yaw rate feedback sensors and usually includes some automatic turn coordination assistance. The yaw damper system 10 is well known to those versed in the aircraft automatic flight control art and a detailed disclosure thereof is not necessary in connection with the present invention. The signal output of yaw damper 10 is supplied to a servo amplifier 11 through summing device 12 and is then fed to a conventional series servo actuator 13 for positioning a yaw flight control surface, such as the anti-torque propeller, through conventional mechanical differential linkages 14 and usually a boost actuator (not shown). A control surface position sensor, such as a synchro 15, provides a feed back signal to summation device 12 in a conventional fashion. Thus, the yaw damper servo subsystem provides short term body axis stabilization for the helicopter about its yaw axis and, during commanded turns, provides some turn coordination assistance. The system also utilizes, as a conventional heading hold input, yaw signals $\psi$ on terminals 4 which may be derived from a conventional synchro signal generator responsive to a directional information source, such as the directional gyroscope of a conventional gyromagnetic compass system or the synchro output of a gimballed or strapped down reference system. Since the present invention is illustrated as incorporated in the helicopter yaw axis and specifically for providing a pilot overridable heading hold function throughout 360°, a four quadrant heading synchro signal converter 20 is employed. The construction, function, and operation of converter 20 is disclosed in detail in the U.S. Pat. No. 4,017,726 to E. R. Skutecki and C. D. Griffith for a "Four Quadrant Rate Taker and Synchronizer", issued Apr. 12, 1977 and assigned to Sperry Corporation. As disclosed in the patent, the converter 20 receives the X, Y, and Z outputs of the windings of a conventional directional reference synchro (not shown) at corresponding lettered terminals in FIG. 1 and converts these component signals to an output signal on lead 21 that is proportional to the substantially linear displacement error of the craft heading relative to a reference heading, say magnetic north, over its full 360° range. Since the detailed operation of converter 20 is given in the referenced patent, it will not be repeated here. For the purposes of the present invention, suffice it to say that each of the XZ and YZ voltages at the outputs of demodulators 22 and 23, respectively, are applied to clampable and unclampable synchronizers 24 and 25 identified as the X-Synch and Y-Synch respectively, the primary function of which synchronizers provides a means for generating a heading error from an established heading when clamped and for synchronizing or following the heading output of the heading synchro when unclamped during commanded changes in the heading of the helicopter or vehicle. According to the present invention, this clamping and unclamping is performed in a unique manner through switches 26 and 27 respectively, which may be conventional MOSFET devices or other conventional solid state switches. These switches connect conventional integrating amplifiers 28 and 29, respectively, in feed back fashion to summing junctions 22' and 23' at the outputs of demodulators 22 and 23, respectively, thereby providing respective synchronizing loops 30 and 31 having normal predetermined, relatively short term time constants of, say, 0.1 seconds when the switches 26 and 27 are fully conducting. When these switches are not conducting, the synchronizing loops 30, 31 are open and the output of the integrators 28 and 29 provide reference voltages which, in accordance with the teachings of the U.S. Pat. No. 4,017,726. in turn provide a reference voltage at the output of converter 20, a signal corresponding to the instantaneous craft heading existing at the time the switches become fully open. Thereafter, any changes in craft heading result in an error signal on lead 21 corresponding to any heading change from the reference heading. The heading error output of the converter 20 on lead 21 is applied to the yaw axis servo amplifier 11 and actuator 13 through a suitable displacement signal path 35 to return the craft heading to the reference heading. An integral signal path 36 may be incorporated in the system to provide long term heading trim in a conventional fashion.

It should be pointed out that the dual channel synchronization and cross channel multiplication complexity of the analog heading signal converter 10 is not required if the invention is implemented using digital techniques. Taking advantage of the computational power of the digital implementation, the three wire directional synchro output may be conveniently converted to single wire heading data using a conventional arc-tangent subroutine. In such instance, the integrator-synchronization loop simplifies to the equivalent analog single loop configuration 32 schematically illustrated in FIG. 3.

In typical prior art systems, the aircraft heading is held constant through the heading error $\psi_e$ on lead 21 being supplied to actuator 13 and to the yaw control surface or anti-torque propeller control system of the craft, which signal must be effectively removed when a turn or change of heading is commanded and a new heading reference is established at turn completion. This has been conventionally provided by the synchronizing loops 30,31 through high gain integrators 28,29 having fast time constants as previously described. This has been accomplished in the past by rendering switches 26,27 conducting whenever a yaw or heading change was commanded and when the desired turn was completed, switches 26,27 were made non-conducting so that the output of integrators 28,29 provided the new heading reference. But the new heading commanded and subsequently achieved by the prior art technique was determined by the substantially instantaneous closure and subsequent substantially instantaneous opening of switches 26,27 and under most circumstances would not yield precisely the desired new heading due to aircraft turn entry and turn exit dynamic characteristics. Often the human pilot had to again manipulate his manual controls, perhaps repeatedly, until the desired heading was finally achieved. In the embodiment illustrated in FIG. 1 (FIGS. 1a and 1b), the pilot might repeatedly briefly press the appropriate foot pedal until the synchronizer output corresponded to the desired heading value.

Other dynamic effects were present in typical prior art control systems. For example, when a turn was initiated and switches 26,27 were rendered conductive, the actual craft heading might not have necessarily corresponded to the reference heading because the system was in the process of correcting a heading error. Consequently, a heading error signal $\psi_e$ was present on lead 21, resulting in a displacement of the yaw actuator 13 at the time the maneuver was initiated. The undesired result of the latter effect was a sudden and objectionable motion of the yaw actuator 13 when switches 26 and 27 were rendered conductive.

The present invention overcomes the foregoing problems of the prior art by providing a means for effectively varying the time constant of the synchronization loops 30,31 upon turn entry and turn exit commands through the utilization of variable pulse width modulation of the voltage controlling switches 26 and 27.

For this purpose, there is provided a pulse width modulator 40 controlled from turn-related logic circuits responsive to the pilot's yaw controller or pedals 41 and force detent switch 42, bank angle related logic signals 43,44, and roll cyclic stick out-of-detent switch (not shown) signal source 45. The modulator 40 is itself controlled from network 46 responsive to these logic circuits. Modulator 40 is controlled in accordance with a force being applied to pedals 41 through force switch 42, which may be a conventional bungee switch, which when forced out of its neutral detent position and into conducting contact with a suitable source of voltage provides a logic signal at one input of OR gate 47 which in turn causes operation of network 46. This network, which comprises an integrator 48, a source of charging voltages 49, switch 50, and Zener diode 51, determines the sense and time of variation of the pulse width output of the modulator 40 and operates as follows. Assuming a zero output from gate 47, switch 50 is in its upper position and supplies a negative voltage from source 49 to the input of integrator 48. This causes integrator 48 to ramp to a positive voltage as set by feed back Zener diode 51. The gains are selected such that at maximum positive voltage, the synchronizers 30,31 are clamped, as will be described. When gate 47 goes high (as by a pilot commanded turn), switch 50 supplies a positive voltage to the integrator 48 input, causing it to ramp downward. At zero output of the integrator, the synchronizers 30,31 are in full follow-up; the Zener diode 51 acting as a diode in the forward conducting state to maintain the integrator output near zero.

The variable pulse width modulator 40 may be conventional and includes generally a source 52 of, say, 400 Hz voltage having a sawtooth waveform and a comparator 53. In conventional fashion, the up-down ramp voltage output of integrator 48 is compared with the sawtooth voltage from source 52 in comparator 53 to provide a pulse output on lead 54, the width of which varies in accordance with the ramp voltage amplitude. This is schematically illustrated in the lower of the curves of FIG. 2. As above, with a zero output of gate 47, the output voltage of integrator 48 is maximum positive and the output of comparator 53 is zero since the positive voltage is at or above the peaks of the sawtooth. With the gate 47 output high and the integrator 48 ramping downward, the peaks of the sawtooth wave begin to appear as narrow pulse outputs of the comparator. As the ramp voltage continues downward, the pulses get wider and wider until the output of the integrator is zero, resulting in a full pulse width output or essentially a steady state or d.c. signal on lead 54.

In accordance with the present invention, the output of the variable pulse width modulator 40 is applied to the MOSFET switches 26,27 of synchronizers 30,31 to ramp the synchronizer loop time constant from the infinite or clamped state to its normal follow-up value of say 0.1 seconds over a predetermined time period of say 2.5 seconds and vice versa when a turn or change in heading is commanded by the pilot. This action is graphically illustrated in the upper portion of FIG. 2. Thus, as previously stated, when the turn is commanded by the pilot pressing his foot pedals 41, the synchronizers 30,31 are not immediately turned on so that if, for example, the yaw damper system was in the process of correcting a yaw motion of the craft, any heading signal from the directional reference synchro at the inputs to the integrators 28,29 will have minimal effect since the switches 26,27 will be conducting for only the short time periods of the then narrow pulses from the variable pulse width modulator 40. Similarly, upon turn completion when the pilot removes force from the pedals 41, the synchronizers 30,31 will not instantaneously be clamped, inherently causing a heading overshoot, but will gradually be ramped to a clamped condition, resulting in a smooth capture of the desired heading without excessive overshoot, if any.

Referring still to FIG. 1, (FIGS. 1a and 1b), it is to be noted that OR gate 47 is also controlled by additional signals that may appear at its second input. The state of the associated AND gate 55 is controlled by logic signals coupled to terminal 43 and from flip-flop 56 by signals on terminals 44 and 45. The SET input of flip-flop 56 is controlled by the logic signal at terminal 45 which also serves as an input to inverter 57. The output of inverter 57 goes to one input of an AND gate 58, while the signal on terminal 44 goes to a second input thereof. The output of AND gate 58 goes to the reset input of flip-flop 56. The output of flip-flop 56 goes to one input of AND gate 55, while the signal on terminal 43 goes to a second input thereof. The output of AND gate 55 serves as a second input to OR gate 47. The signal on terminal 43 is present when craft air speed reaches or exceeds 60 knots, for example. The logic signal on terminal 45 is generated by a conventional force switch, similar to the pedal switch 42 and responsive to the roll cyclic stick controller being actuated by the pilot. Finally, the logic signal on terminal 44 is present when the craft roll angle is less than a predetermined value, for example, 6° as may be conventionally provided by a vertical gyroscope (not shown).

At airspeeds below 60 knots, the logic signal at terminal 43 is low. In this circumstance, the pilot may cause the helicopter simply to yaw by using the control pedals 41, which changes the pitch of the anti-torque rotor through mechanical cables or push rods and linkage 14 which includes a conventional differential link responsive also to the series servo actuator 13. The force switch 42 coupled to the bungee spring closes, supplying a high logic signal output from gate 47, starting operation of modulator 40, as at 40a in FIG. 2, as described. As soon as the pilot releases the pedal force at substantially the desired new heading bungee switch 42 opens, the logic signal at the output of gate 47 goes low and the synchronizers 30,31 gradually return to their clamped condition, as at 40b in FIG. 2 and as described, and the new heading is achieved with minimum or no overshoot.

In a helicopter cruise mode, airspeed is normally greater than 60 knots and the logic signal at terminal 43 is high. Turning of the craft is initiated as in a conventional fixed wing aircraft by the pilot banking the craft through the conventional roll cyclic stick (not shown). Heading synchronizers 30,31 are gradually placed in follow-up as described, since the logic signal at terminal 45 is high and has caused flip-flop 56 to transition to its high state (where it remains until its reset terminal goes high), providing the required second high signal at the input of gate 55 to cause gate 47 output to go high. When the craft bank angle exceeds a predetermined value, say 6°, the logic signal on terminal 44 goes low, permitting the pilot to establish the desired bank angles by removing force from the roll cyclic stick and leaving the synchronizers 30,31 full on since with bank angle logic 44 low, stick detent logic can go low without resetting flip-flop 56 due to inverter 57.

To arrest the turn maneuver, the pilot operates the roll cyclic stick to return the craft to level attitude. Accordingly, the logic signal at terminal 45 goes high again but has no effect on the already set flip-flop 56. As the pilot removes stick force anticipating the roll to zero, bank angle will reduce to below 6° and reach zero approximately simultaneously with the stick being returned to its detent position. In this situation, the logic signal on terminal 44 goes high and the detent logic signal on terminal 45 goes low. Thus, when this occurs, the inverter 57 output goes high, producing reset command by AND gate 58 which causes flip-flop 56 to transition to the low state, forcing the output of gate 47 low. This causes the synchronizer integrator loops 30,31 gradually to transition to their clamped states along gain level transition 40b of FIG. 2.

It will be understood that the invention is illustrated in a helicopter yaw axis stability augmentation or yaw damper control having a heading hold mode in which a heading error term is provided by a clampable heading synchronizer and a heading command augmentation mode during which the synchronizer is unclamped. At low speeds, the synchronizer is gradually unclamped to operate in the follow-up mode whenever the pilot presses his yaw control pedals. This time constant of the synchronizer or follow-up loop is varied relatively slowly as a function of time from the initial pedal pressure. That is, when the pedal out-of-detent condition is first sensed, the synchronizer loop is effectively placed in a long time constant follow-up mode; then the time constant is gradually decreased over a predetermined time period to a normal short time constant. When the turn maneuver is complete and the pedals are returned to neutral, the synchronizer or follow-up loop time constant is gradually increased from the low to the high or infinite time constant; i.e., clamped, establishing a new heading reference for the heading hold mode.

In normal high speed cruise, the synchronizer is similarly gradually placed in its follow-up mode whenever the pilot commands a turn by actuating the roll cyclic stick to establish a bank angle and consequent change in heading. Upon completion of the banked turn, the synchronizer loop is gradually returned to its hold mode by the pilot returning the stick to neutral, the aircraft rolling out to its zero roll attitude at the desired new heading.

While the invention has been described in its preferred embodiments, it is to be understood that the words which have been used are words of description rather than of limitation and that changes may be made without departing from the true scope and spirit of the invention in its broader aspects.

What is claimed is:

1. In an automatic stabilization and control apparatus for aircraft adapted to stabilize short term motion of aircraft about one of its primary axes through a control surface actuator means and including attitude reference means for providing long term stability of the aircraft about said axis, said apparatus further including means for overriding said long term stability and for changing said attitude reference to a new attitude reference, said apparatus comprising:

attitude reference means for providing a signal in accordance with the attitude of said craft about said axis, clampable and unclampable synchronizing means responsive to said attitude signal for providing when clamped an error signal to said control surface actuating means corresponding to deviations in the attitude of the craft about said axis from a reference attitude and for returning said craft attitude to said reference attitude thereby reducing said error signal to zero and when unclamped for maintaining said attitude error signal effectively zero during said attitude change, switching means responsive to said overriding means for clamping and unclamping said synchronizer means, said overriding means including:

override command means, variable pulse width modulator means responsive to initiation and termination of said override command means for providing a first series of pulses of gradually increasing width over a predetermined time period and a second series of pulses of gradually decreasing width over a predetermined period of time, and means for supplying said first and second series of pulses to said switching means whereby said synchronizer is gradually unclamped upon override initiation and gradually clamped upon override termination.

2. The apparatus as set forth in claim 1 wherein said overriding means includes:

switch means responsive to movement of a pilot's attitude controller; and means responsive to said controller switch means and connected with said variable pulse width modulator for initiating and terminating said series of pulses.

3. The apparatus as set forth in claim 2 wherein said controller switch responsive means includes:

integrator means responsive to operation of said controller switch means for providing increasing and decreasing ramp signals over said predetermined time period, and means for supplying said ramp signals to said pulse width modulator means.

4. The apparatus as set forth in claim 3 wherein said aircraft primary axis is the yaw axis, said attitude reference is a directional reference, and wherein said override controller is the pilot's yaw controller.

5. The apparatus as set forth in claim 4 further including:

first logic means responsive to said yaw controller for operating said integrator means, and second logic means coupled with said first logic means and responsive to a craft bank angle command and an actual bank angle greater than a predetermined value and coupled with said first logic means for also operating said integrator means.

6. The apparatus as set forth in claim 5 wherein said aircraft is a helicopter and wherein said second logic means includes further logic means responsive to an airspeed less than a predetermined value for inhibiting said second logic means.

* * * * *